United States Patent
Seshadri et al.

(10) Patent No.: US 11,687,414 B2
(45) Date of Patent: Jun. 27, 2023

(54) INTELLIGENT BACKUP ENGINE FOR DATA FRESHNESS

(71) Applicant: International Business Machines Corporation, Armonk, NY (US)

(72) Inventors: Sangeetha Seshadri, Plano, CA (US); Paul Henri Muench, San Jose, CA (US); Umesh Deshpande, San Jose, CA (US); Priyaranjan Behera, Santa Clara, CA (US)

(73) Assignee: International Business Machines Corporation, Armonk, NY (US)

( * ) Notice: Subject to any disclaimer, the term of this patent is extended or adjusted under 35 U.S.C. 154(b) by 185 days.

(21) Appl. No.: 16/835,782

(22) Filed: Mar. 31, 2020

(65) Prior Publication Data
US 2021/0303409 A1  Sep. 30, 2021

(51) Int. Cl.
*G06F 11/14* (2006.01)
*G06F 11/30* (2006.01)

(52) U.S. Cl.
CPC ...... *G06F 11/1461* (2013.01); *G06F 11/1451* (2013.01); *G06F 11/1456* (2013.01); *G06F 11/1464* (2013.01); *G06F 11/1469* (2013.01); *G06F 11/3013* (2013.01)

(58) Field of Classification Search
CPC ............. G06F 11/1461; G06F 11/1451; G06F 11/1456; G06F 11/1464; G06F 11/1469; G06F 11/3013

USPC ......................................................... 711/162
See application file for complete search history.

(56) References Cited

U.S. PATENT DOCUMENTS

| | | | |
|---|---|---|---|
| 7,725,444 B2 | 5/2010 | Devarakonda | |
| 7,809,688 B2 | 10/2010 | Cisler | |
| 7,937,420 B2 | 5/2011 | Tabellion | |
| 8,260,750 B1* | 9/2012 | Gugick | G06F 11/1461 707/645 |
| 9,984,141 B2 | 5/2018 | Alatorre | |
| 10,061,657 B1 | 8/2018 | Chopra | |
| 10,838,912 B1* | 11/2020 | Chopra | G06F 11/1458 |
| 2010/0205133 A1 | 8/2010 | Uttamchandani | |
| 2020/0042400 A1* | 2/2020 | Ashokkumar | H04L 67/1095 |
| 2020/0162801 A1* | 5/2020 | McConnell | H04L 67/12 |

FOREIGN PATENT DOCUMENTS

| | | |
|---|---|---|
| CN | 101719165 B | 12/2014 |
| CN | 103746456 B | 4/2018 |
| TW | 201810092 A | 3/2018 |

OTHER PUBLICATIONS

Wikipedia "database application" page, retrieved from https://en.wikipedia.org/wiki/Database_application (Year: 2022).*
Wikipedia "database" page, retrieved from https://en.wikipedia.org/wiki/Database#Database_management_system (Year: 2022).*

(Continued)

*Primary Examiner* — Yair Leibovich
(74) *Attorney, Agent, or Firm* — David B. Woycechowsky (57) ABSTRACT

Technology for identifying relevant data (also called "data of interest") for applying a machine logic based rule and for increasing the frequency of making backups (for example, snapshots) of the relevant data.

12 Claims, 3 Drawing Sheets

(56) References Cited

OTHER PUBLICATIONS

"Method and System for Providing Backup Workload Distributor in Complex Virtual Machine (VM) Environments", An IP.com Prior Art Database Technical Disclosure, Authors et. al.: Disclosed Anonymously, IP.com No. IPCOM000257267D, IP.com Electronic Publication Date: Jan. 28, 2019, 6 pages.

Bedewy, et al. ,"Optimizing Data Freshness, Throughput, and Delay in Multi-Server Information-Update Systems," arXiv:1603.06185v5 [cs.IT] Mar. 30, 2017, 7 pages.

IBM, "Welcome to the IBM Community", downloaded from the internet Feb. 10, 2020, 3 pages, <https://www.ibm.com/developerworks/community/blogs/storageneers/entry/IBM_FlashSystem_9100_Multi_Cloud_Solution_for_Data_Reuse_Protection_and_Efficiency?lang=en_us>.

* cited by examiner

INTELLIGENT BACKUP ENGINE FOR DATA FRESHNESS

BACKGROUND

The present invention relates generally to the field of backing up machine readable data of various types.

Monetizing and reusing backup data for other purposes such as analytics, DevOps or training ML (machine learning) models is a growing use-case for backup software.

SUMMARY

According to an aspect of the present invention, there is a method, computer program product and/or system that performs the following operations (not necessarily in the following order): (i) receiving a first rule data set including information indicative of a first machine logic based rule; (ii) identifying, by machine logic, relevant data that is relevant to application of the first machine logic based rule; and (iii) responsive to the identification of the relevant data, increasing a frequency value for the frequency of backing up the relevant data.

DETAILED DESCRIPTION

This Detailed Description section is divided into the following subsections: (i) The Hardware and Software Environment; (ii) Example Embodiment; (iii) Further Comments and/or Embodiments; and (iv) Definitions.

I. The Hardware and Software Environment

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (for example, light pulses passing through a fiber-optic cable), or electrical signals transmitted through a wire.

A "storage device" is hereby defined to be anything made or adapted to store computer code in a manner so that the computer code can be accessed by a computer processor. A storage device typically includes a storage medium, which is the material in, or on, which the data of the computer code is stored. A single "storage device" may have: (i) multiple discrete portions that are spaced apart, or distributed (for example, a set of six solid state storage devices respectively located in six laptop computers that collectively store a single computer program); and/or (ii) may use multiple storage media (for example, a set of computer code that is partially stored in as magnetic domains in a computer's non-volatile storage and partially stored in a set of semiconductor switches in the computer's volatile memory). The term "storage medium" should be construed to cover situations where multiple different types of storage media are used.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
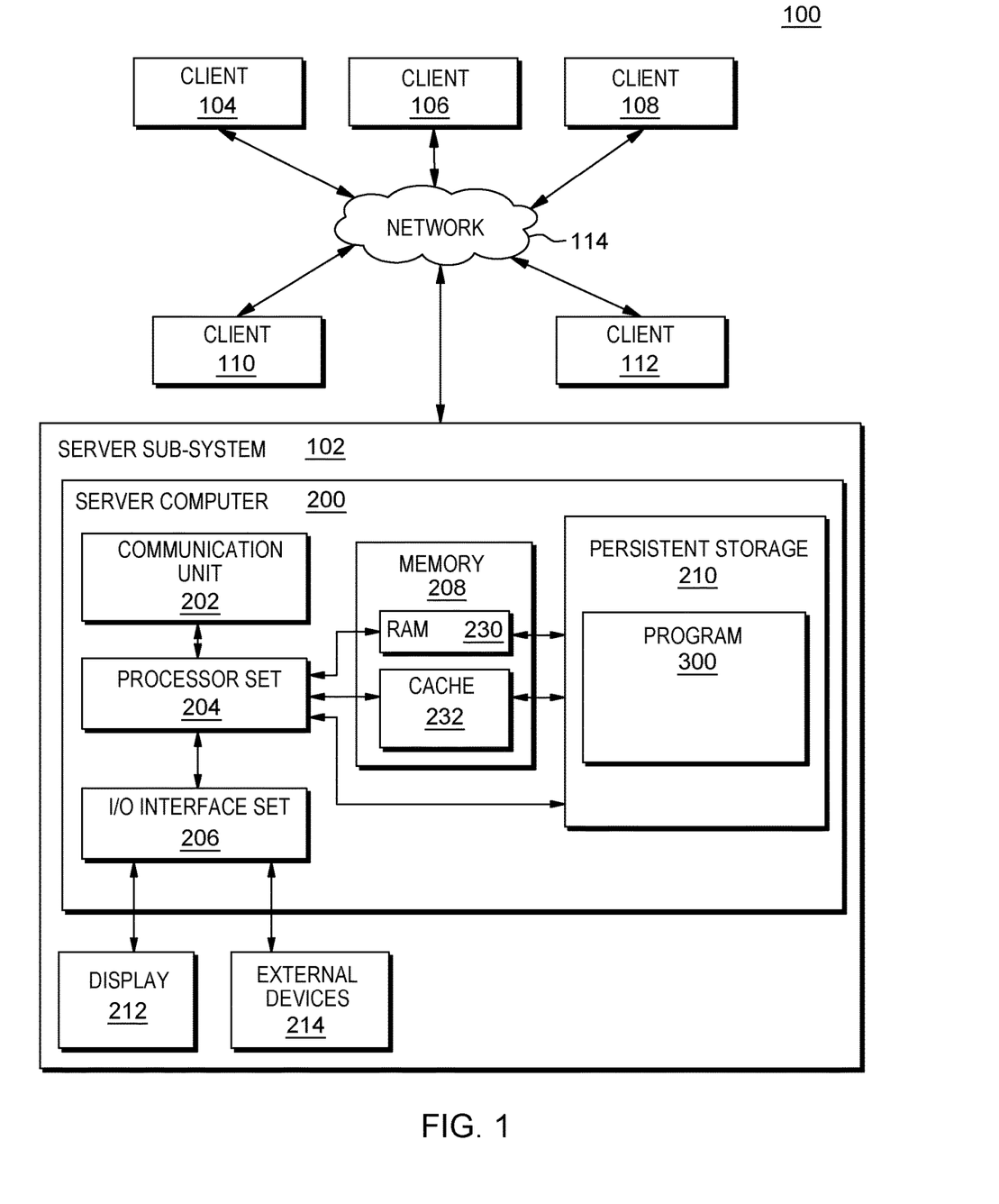
FIG. 1 is a block diagram of a first embodiment of a system according to the present invention.

As shown in FIG. 1, networked computers system 100 is an embodiment of a hardware and software environment for use with various embodiments of the present invention. Networked computers system 100 includes: server subsystem 102 (sometimes herein referred to, more simply, as subsystem 102); client subsystems 104, 106, 108, 110, 112; and communication network 114. Server subsystem 102 includes: server computer 200; communication unit 202; processor set 204; input/output (I/O) interface set 206; memory 208; persistent storage 210; display 212; external device(s) 214; random access memory (RAM) 230; cache 232; and program 300.

Subsystem 102 may be a laptop computer, tablet computer, netbook computer, personal computer (PC), a desktop computer, a personal digital assistant (PDA), a smart phone, or any other type of computer (see definition of "computer" in Definitions section, below). Program 300 is a collection of machine readable instructions and/or data that is used to create, manage and control certain software functions that will be discussed in detail, below, in the Example Embodiment subsection of this Detailed Description section.

Subsystem 102 is capable of communicating with other computer subsystems via communication network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client subsystems.

Subsystem 102 is shown as a block diagram with many double arrows. These double arrows (no separate reference numerals) represent a communications fabric, which provides communications between various components of subsystem 102. This communications fabric can be implemented with any architecture designed for passing data and/or control information between processors (such as microprocessors, communications and network processors, etc.), system memory, peripheral devices, and any other hardware components within a computer system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for subsystem 102; and/or (ii) devices external to subsystem 102 may be able to provide memory for subsystem 102. Both memory 208 and persistent storage 210: (i) store data in a manner that is less transient than a signal in transit; and (ii) store data on a tangible medium (such as magnetic or optical domains). In this embodiment, memory 208 is volatile storage, while persistent storage 210 provides nonvolatile storage. The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202 provides for communications with other data processing systems or devices external to subsystem 102. In these examples, communications unit 202 includes one or more network interface cards. Communications unit 202 may provide communications through the use of either or both physical and wireless communications links. Any software modules discussed herein may be downloaded to a persistent storage device (such as persistent storage 210) through a communications unit (such as communications unit 202).

I/O interface set 206 allows for input and output of data with other devices that may be connected locally in data communication with server computer 200. For example, I/O interface set 206 provides a connection to external device set 214. External device set 214 will typically include devices such as a keyboard, keypad, a touch screen, and/or some other suitable input device. External device set 214 can also include portable computer-readable storage media such as, for example, thumb drives, portable optical or magnetic disks, and memory cards. Software and data used to practice embodiments of the present invention, for example, program 300, can be stored on such portable computer-readable storage media. I/O interface set 206 also connects in data communication with display 212. Display 212 is a display device that provides a mechanism to display data to a user and may be, for example, a computer monitor or a smart phone display screen.

In this embodiment, program 300 is stored in persistent storage 210 for access and/or execution by one or more computer processors of processor set 204, usually through one or more memories of memory 208. It will be understood by those of skill in the art that program 300 may be stored in a more highly distributed manner during its run time and/or when it is not running. Program 300 may include both machine readable and performable instructions and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer-readable storage media that is capable of storing program instructions or digital information.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

II. Example Embodiment

Figure 2:
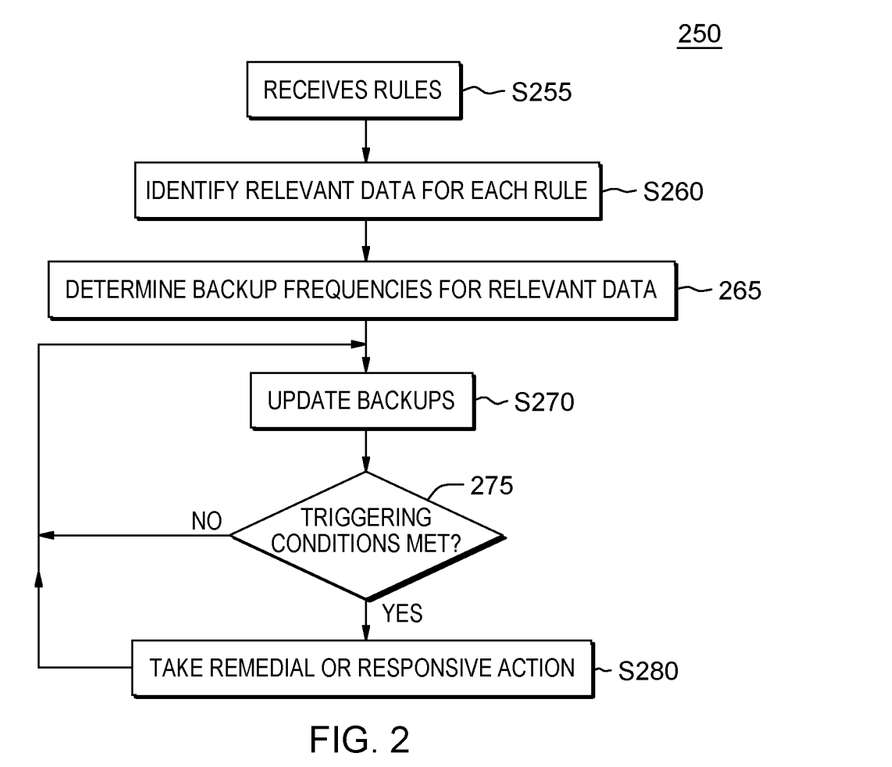
FIG. 2 is a flowchart showing a first embodiment method performed, at least in part, by the first embodiment system.
Figure 3:
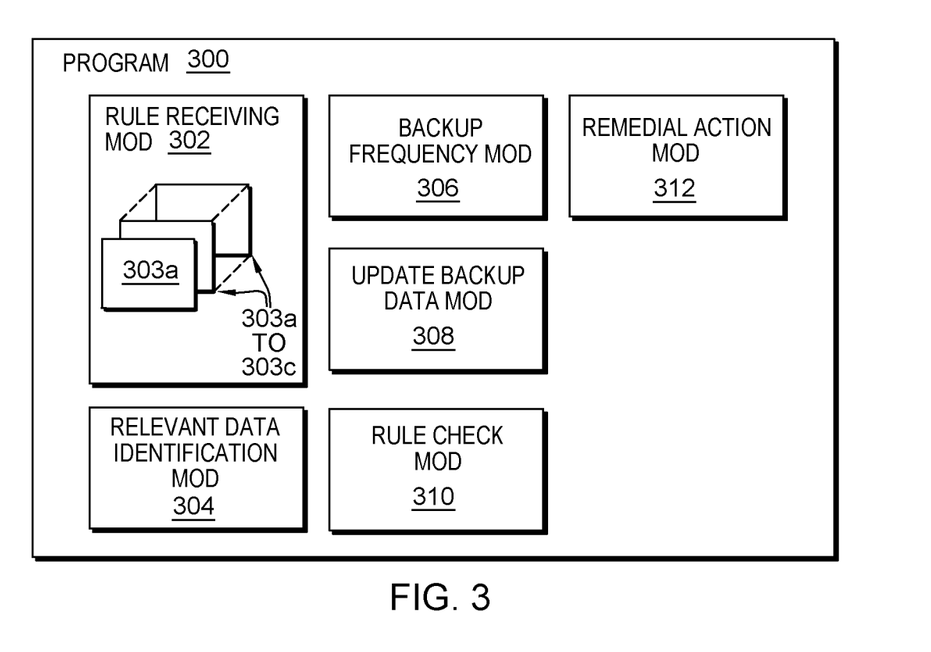
FIG. 3 is a block diagram showing a machine logic (for example, software) portion of the first embodiment system.

As shown in FIG. 1, networked computers system 100 is an environment in which an example method according to the present invention can be performed. As shown in FIG. 2, flowchart 250 shows an example method according to the present invention. As shown in FIG. 3, program 300 performs or control performance of at least some of the method operations of flowchart 250. This method and associated software will now be discussed, over the course of the following paragraphs, with extensive reference to the blocks of FIGS. 1, 2 and 3.

Processing begins at operation S255, where rule receiving module ("mod") 302 receives rules (also sometimes herein referred to as "insights") that, at least partially, control how a computerized system operates. This example of flowchart 250 will involve three (3) different rules for three (3) different computerized systems to help fully show the possible variety and/or scope of the subject matter of rules that may be subject to the techniques of various embodiments of the present invention. In this example, the three (3) example rules (respectively stored as rule data sets 303a, 303b, 303c, as shown in FIG. 3) will be provided in the following three (3) paragraphs.

R1. UNSAFE TEMPERATURE RULE: If the change in the temperature (delta T), over a five minute span, of a component of a machine tool exceeds a threshold value, then it is inferred that further operation of the machine tool is considered unsafe and the machine tool is shut down.

R2. ATTACK RULE: If there are multiple failed attempts in network logs, then it is inferred that there is a potential attack on network security and remedial network security actions are taken.

R3. PRICING RULE: If trades in the pork belly futures market, made over the past three days, show a decrease in unit price of pork belly futures, then the company will lower its asking price for pork belly futures proportionate to the observed decrease in unit price.

Processing proceeds to operation S260, where relevant data identification mod 304 identifies data that is relevant in machine logic based implementation of the rule. The relevant data (also sometimes herein referred to as "data of interest") for each of the three (3) rules R1 to R3 will be respectively given in the following three (3) paragraphs.

R1. UNSAFE TEMPERATURE RULE: RELEVANT DATA: There is a table called sensor data that tracks three characteristics of the operation machine tool in three separate columns: (i) rotational speed, (ii) torque on the motor, and (iii) temperature of a component. For purposes of applying R1, the temperature column in the sensor data table is identified by the relevant data identification mod as the relevant data for applying R1.

R2. ATTACK RULE: RELEVANT DATA: The relevant data identified by mod 304 for applying R2 is: (i) latest snapshot of network log files; and (ii) latest snapshot of network log table. Although this example identifies both of these types of data as relevant data, alternatively, some embodiments may identify only one type or the other.

R3. PRICING RULE: RELEVANT DATA: The relevant data identified by mod 304 for applying R3 is: the unit prices for the latest twenty (20) trades in the pork belly futures market, which will be reflected, on an ongoing basis, in a pork belly futures database that has one record for each trade in the pork belly futures market, with each record including a field for the unit price under the trade.

Processing proceeds to operation S265, where backup frequency mod 306 determines, or changes, the frequency at which the relevant data, previously identified at operation 304 is backed. More specifically, this frequency is determined in a manner that is based, at least in part, upon the identification of relevant data made at operation S260. The relevant data for each of the three (3) rules R1 to R3 will be respectively given in the following three (3) paragraphs.

R1. UNSAFE TEMPERATURE RULE: FREQUENCY OF BACKUP: while the sensor data table is normally backed up every five minutes as a default setting, the temperature column in the sensor data table will be backed up every minute so that R1 can be applied once per minute, rather than once every five (5) minutes.

R2. ATTACK RULE: FREQUENCY OF BACKUP: In order to increase the frequency of applying rule R2 from once per five (5) minutes to once per minute: (i) the frequency of backing up the latest snapshot of network log files is increased from once every five (5) minutes to once every minute; and (ii) the frequency of backing up the latest snapshot of network log files is increased from once every five (5) minutes to once every minute.

R3. PRICING RULE: FREQUENCY OF BACKUP: The most recently added twenty records in the pork belly futures database is increased in its backup frequency from once per hour to once per second to allow R3 to be applied once per second instead of only once per hour.

Processing proceeds to operation S270, where update backup data mod 308 updates all the various backup data stored data system-wide, making sure that the three types of relevant data identified at operation S260 are updated at the respective associated frequencies determined at operation S265.

Processing proceeds to operation S275 where rule check mod 310 determines if any of the rules R1 to R3 are met. If the triggering condition of any of the rules is met then processing proceeds to operation S280, where remedial action mod 312 takes the appropriate responsive or remedial actions as specified as the respective consequential result portions of rules R1 to R3 (stored as rules 303a to 303c). If the triggering conditions of none of the rules are met, then processing loops back to operation S270.

III. Further Comments and/or Embodiments

Some embodiments of the present invention recognize the following facts, potential problems and/or potential areas for improvement with respect to the current state of the art: (i) backup frequency impacts "time-to-insight"; (ii) naively increasing backup frequency on all objects increases load and resource usage of backup system/service; (iii) system determined low frequency backup (for example, daily for all databases or applications) may increase time-to-insight; (iv) under currently conventional technology, backup frequency is determined by other considerations such as compliance, known best-practices or resource availability; (v) fixed schedule backups may delay time to insight; and/or (vi) alternative application-level approaches to capture changes to interesting data requires customization and may be expensive to implement.

Some embodiments of the present invention may include one, or more, of the following operations, features, characteristics and/or advantages: (i) intelligent backup engine to automatically trigger backups based on changes to "interesting data" that may affect insights; (ii) a system to automatically trigger backups based on changes to data identified as interesting or significant to a target application; (iii) an intelligent backup engine that gathers information such as read/write count and frequency from backup target application, middleware (OS/hypervisor), filesystem or block system; (iv) an intelligent backup engine that gathers change tracking information from backup source application, middleware (OS/hypervisor), filesystem or block system; (v) an intelligent backup engine that correlates change tracking information with identified data of interest and automatically triggers backup when significant changes are detected; and/or (vi) an intelligent backup engine that notifies application when fresh backup with incremental changes is available.

Figure 4:
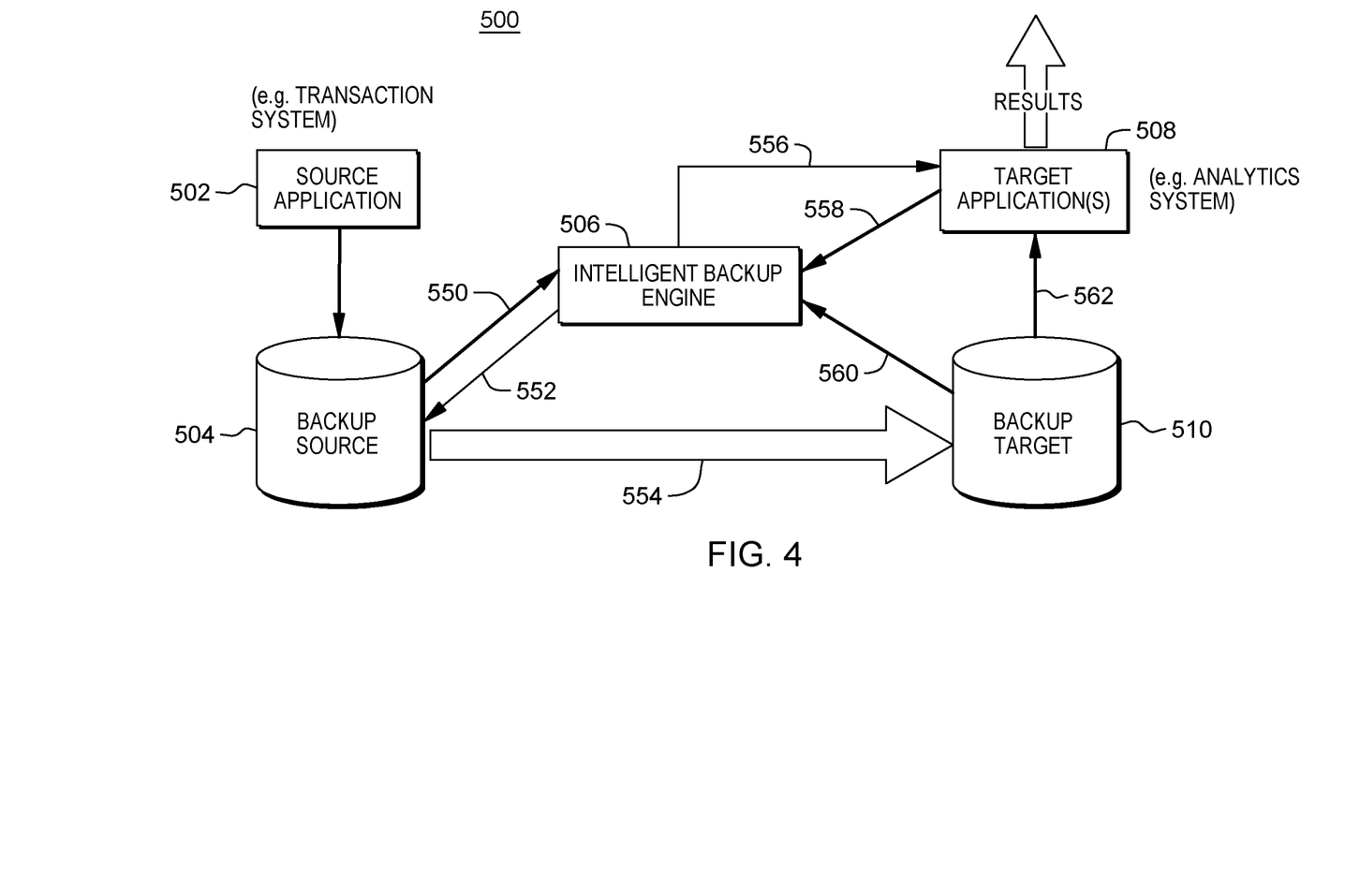
FIG. 4 is a block diagram of a second embodiment of a system according to the present invention.

As shown in FIG. 4, block diagram 500 represents a computer system where an intelligent backup engine automatically triggers backups based on changes to interesting data that may affect insights. Computer system 500 includes: source application 502; backup source 504; intelligent backup engine 506; target application(s) 508; and backup target 510. Data communication arrow 550 represents communication of change tracking information. Data communication arrow 552 represents communication of backup trigger information. Data communication arrow 554 represents communication of an incremental copy. Data communication arrow 556 represents communication of a notification to the target application(s) of new data. Data communication arrows 558 and 560 represents communication of insight information. Data communication arrow 562 represents communication of read data related information.

An embodiment of a method according to the present invention includes the following operations: (i) intelligent backup engine gathers "data of interest" from the following target sources: (a) application and application-level specifications (for example, for application layer backups of databases, this may be tables, databases or even column-level information), (b) filesystem and files identified based on target application access patterns, and (c) block storage system and blocks identified based on target application access patterns; (ii) intelligent backup engine gathers change tracking information from the following sources application, filesystem, block storage system; (iii) intelligent backup engine correlates information from operations (i) and (ii) to determine that there are changes to "data of interest"; (iv) responsive to the determination that there are changes to "data of interest," triggering on-demand backup; (v) backup requests results in an incremental copy of changed data to backup target location; (vi) once backup completes, notify target application of availability of new data (for example, target application may register for alerts or notifications for changes to specific data); (vii) target application reads new data generating fresh results; and (viii) target application provides feedback to intelligent backup engine to improve identification of data of interest in future iterations of this method.

Further with respect to operation (iv) in the method of the previous paragraph, the intelligent backup engine triggers a backup only if the change is considered significant (for example, above a pre-defined threshold, or based on time since last change).

Some possible enhancements to the method described two (2) paragraphs previous, (i) in a set up with more than one target application, the intelligent backup engine computes an optimal backup frequency while minimizing a metric such as load on backup engine or load on backup source; (ii) in a system where "data of interest" changes are different rates, the intelligent backup engine computes an optimal backup frequency while minimizing a metric such as load on backup engine, load on backup source or total amount of data transferred; and/or (iii) based on application or user feedback, the intelligent backup engine may modify criteria (for example, threshold, frequency of change) or set of data identified as "interesting".

An embodiment of a system to automatically trigger backups based on changes to data identified as interesting or significant to a target application includes the following features: (i) an intelligent backup engine that gathers information such as read/write count and frequency from backup target application, middleware (OS/hypervisor), filesystem or block system; (ii) an intelligent backup engine that gathers change tracking information from backup source application, middleware (OS/hypervisor), filesystem or block system; (iii) an intelligent backup engine that correlates change tracking information with identified data of interest and automatically triggers backup when significant changes are detected; and (iv) an intelligent backup engine that notifies application when fresh backup with incremental changes is available.

Some embodiments of the present invention may include one, or more, of the following operations, features, characteristics and/or advantages: (i) backup frequency based on changes to data of interest where the data of interest is identified by the target application at a fine granularity based on user input or access frequency of objects; (ii) the foregoing item on this list can be applied to, for example, tables/columns in data bases and specific blocks or files in volume or file based backup; (iii) addresses dynamic and fine-grained monitoring of data access at target application to identify changes of interest to the "target application"; (iv) backup policy that may automatically and dynamically vary the source application data's backup frequency as the target application's access patterns change; (v) "data freshness" is used as a concept to decide when to age out data in a multi-tiered environment; (vi) uses target application's access patterns to determine source application's backup frequency; (vii) optimizing data freshness in multi-server information-update systems; (viii) optimizing throughput in multi-server information-update systems; (ix) minimizing delay in multi-server information-update systems; (x) adjusting a backup policy based on data freshness or selection of subset of data based on access patterns at target; (xi) identification of subset of data to be backed-up more frequently based on access patterns at target; (xii) determination of optimal backup policy that maximizes data freshness of frequently accessed or user-defined data objects at target while staying within resource constraints on and guaranteeing SLAs (service level agreements); and/or (xiii) adjustment of backup policy on-demand based on access patterns or user-input at target location where the backups are being accessed.

Some embodiments of the present invention may include one, or more, of the following operations, features, characteristics and/or advantages: (i) data of interest may take the form of aggregate values (for example, average, min, max) for specific column(s) of data storage table(s) (for example, aggregate value of sensor temperature values, aggregate value of list price on homes, aggregate value of stock price); (ii) a user may base decisions (such as, market trend determination, identification of unsafe conditions, stock buy/sell) on values of these fields; (iii) if the system recognizes more frequent querying on these columns (for example, query every five (5) minutes), the system may adjust the backup frequency for the corresponding table from a relative long interval (for example, hourly) to a shorter time interval (for example, every five (5) minutes; (iv) on the other hand, for infrequently queried data, the backup frequency may remain at the relatively large time interval value (for example one (1) hour); (v) similar examples include network traffic monitoring, adjusting pricing models based on more recent customer activity, hospital admission records, tracking status of shipment; (vi) all of the types of information mentioned in the foregoing list item may be stored in a database or a file; (vii) the foregoing scenarios capture multiple user scenarios where user may be interested in specific data (for example, sensor temperature, list price on homes, stock price, network traffic information, customer click-stream or purchase activity, patient admission records, shipment information); (viii) there may also be other information stored which may not be of interest to the user; (ix) the information will first arrive at a primary database, filesystem location or block storage location; (x) the information may be extracted at regular intervals through a backup program which will then populate the information in a secondary instance which is used for other analytical activities; and/or (xi) the backup policy may be adjusted based on usage frequency while taking into consideration resource constraints.

IV. Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

Including/include/includes: unless otherwise explicitly noted, means "including but not necessarily limited to."

Module/Sub-Module: any set of hardware, firmware and/ or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

What is claimed is:

1. A computer-implemented method (CIM) comprising:
receiving historical data relating to operation of a target application;
analyzing, by machine logic, the historical data to determine that a relevant column in a database is frequently revised when the target application is used by end users;
responsive to identification of the relevant column, gathering, by an intelligent backup engine, change tracking information for the relevant column from a set of source(s) including at least: a backup source application;
determining that an amount of changes to the relevant column have exceeded a predetermined threshold value;
responsive to the determination that the amount of changes have exceeded the threshold value, automatically triggering a backup of the relevant column; and
determining an optimal backup policy that maximizes data freshness of the relevant column while staying within applicable resource constraints on and guaranteeing sufficient data freshness to meet service level agreements.

2. The CIM of claim 1 further comprising:
subsequent to the triggering of the backup of the relevant column, receiving recent additional historical data relating to operation of the target application;
analyzing, by machine logic, the recent additional historical data to determine that an additional relevant column in the database is frequently revised when the target application is used by end users;

determining that an amount of changes to the additional relevant column have exceeded an additional predetermined threshold value; and responsive to the determination that the amount of changes in the additional relevant column have exceeded the additional predetermined threshold value, automatically triggering a backup of the additional relevant column.

3. The CIM of claim 1 wherein the set of source(s) further includes a middleware layer including an operating system and a hypervisor running on the operating system.

4. The CIM of claim 1 wherein the set of source(s) further includes a block level data handling system.

5. A computer program product (CPP) comprising:
a set of storage device(s); and
computer code stored collectively in the set of storage device(s), with the computer code including data and instructions to cause a processor(s) set to perform at least the following operations:

receiving historical data relating to operation of a target application, analyzing, by machine logic, the historical data to determine that a relevant column in a database is frequently revised when the target application is used by end users, responsive to identification of the relevant column, gathering, by an intelligent backup engine, change tracking information for the relevant column from a set of source(s) including at least: a backup source application, determining that an amount of changes to the relevant column have exceeded a predetermined threshold value, responsive to the determination that the amount of changes have exceeded the threshold value, automatically triggering a backup of the relevant column; and determining an optimal backup policy that maximizes data freshness of the relevant column while staying within applicable resource constraints on and guaranteeing sufficient data freshness to meet service level agreements.

6. The CPP of claim 5 wherein the computer code further includes instructions for causing the processor(s) set to perform the following operation(s):

subsequent to the triggering of the backup of the relevant column, receiving recent additional historical data relating to operation of the target application;

analyzing, by machine logic, the recent additional historical data to determine that an additional relevant column in the database is frequently revised when the target application is used by end users;

determining that an amount of changes to the additional relevant column have exceeded an additional predetermined threshold value; and responsive to the determination that the amount of changes in the additional relevant column have exceeded the additional predetermined threshold value, automatically triggering a backup of the additional relevant column.

7. The CPP of claim 5 wherein the set of source(s) further includes a middleware layer including an operating system and a hypervisor running on the operating system.

8. The CPP of claim 5 wherein the set of source(s) further includes a block level data handling system.

9. A computer system (CS) comprising:
a processor(s) set;
a set of storage device(s); and
computer code stored collectively in the set of storage device(s), with the computer code including data and instructions to cause the processor(s) set to perform at least the following operations:

receiving historical data relating to operation of a target application, analyzing, by machine logic, the historical data to determine that a relevant column in a database is frequently revised when the target application is used by end users, responsive to identification of the relevant column, gathering, by an intelligent backup engine, change tracking information for the relevant column from a set of source(s) including at least: a backup source application, determining that an amount of changes to the relevant column have exceeded a predetermined threshold value, and responsive to the determination that the amount of changes have exceeded the threshold value, automatically triggering a backup of the relevant column; and determining an optimal backup policy that maximizes data freshness of the relevant column while staying within applicable resource constraints on and guaranteeing sufficient data freshness to meet service level agreements.

10. The CS of claim 9 wherein the computer code further includes instructions for causing the processor(s) set to perform the following operation(s):

subsequent to the triggering of the backup of the relevant column, receiving recent additional historical data relating to operation of the target application;

analyzing, by machine logic, the recent additional historical data to determine that an additional relevant column in the database is frequently revised when the target application is used by end users;

determining that an amount of changes to the additional relevant column have exceeded an additional predetermined threshold value; and responsive to the determination that the amount of changes in the additional relevant column have exceeded the additional predetermined threshold value, automatically triggering a backup of the additional relevant column.

11. The CS of claim 9 wherein the set of source(s) further includes a middleware layer including an operating system and a hypervisor running on the operating system.

12. The CS of claim 9 wherein the set of source(s) further includes a block level data handling system.

* * * * *